United States Patent
Kim et al.

(10) Patent No.: US 10,201,001 B2
(45) Date of Patent: Feb. 5, 2019

(54) METHOD FOR TRANSMITTING REFERENCE SIGNAL ALLOCATION MODE INFORMATION BY DEVICE OPERATING IN FDR MODE

(71) Applicant: LG ELECTRONICS INC., Seoul (KR)

(72) Inventors: Dongkyu Kim, Seoul (KR); Hyunsoo Ko, Seoul (KR); Kwangseok Noh, Seoul (KR); Sangrim Lee, Seoul (KR); Hojae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/578,512

(22) PCT Filed: Jan. 26, 2016

(86) PCT No.: PCT/KR2016/000822
§ 371 (c)(1),
(2) Date: Nov. 30, 2017

(87) PCT Pub. No.: WO2016/195202
PCT Pub. Date: Dec. 8, 2016

(65) Prior Publication Data
US 2018/0160432 A1     Jun. 7, 2018

Related U.S. Application Data

(60) Provisional application No. 62/168,915, filed on Jun. 1, 2015.

(51) Int. Cl.
*H04B 7/00* (2006.01)
*H04W 72/08* (2009.01)
(Continued)

(52) U.S. Cl.
CPC .......... *H04W 72/082* (2013.01); *H04B 1/525* (2013.01); *H04L 5/0048* (2013.01);
(Continued)

(58) Field of Classification Search
CPC .............. H04W 72/082; H04W 72/044; H04L 5/0048; H04L 5/14; H04L 25/02; H04L 25/03; H04B 1/525
(Continued)

(56) References Cited

U.S. PATENT DOCUMENTS

2011/0075754 A1\*  3/2011  Smith .................... H04B 1/109
                                                              375/285
2011/0235728 A1\*  9/2011  Karabinis ................ H03F 3/24
                                                              375/260
(Continued)

FOREIGN PATENT DOCUMENTS

JP            2011-4212 A        1/2011
KR     10-2013-0055685 A         5/2013
(Continued)

*Primary Examiner* — Thai D Hoang
(74) *Attorney, Agent, or Firm* — Birch, Stewart, Kolasch & Birch, LLP

(57) ABSTRACT

A method for transmitting reference signal (RS) allocation mode information by a device operating in a full duplex radio (FDR) mode comprises the steps of: determining to change an RS allocation mode from a first RS allocation mode to a second RS allocation mode for nonlinear component estimation of a residual self-interference signal after antenna and analog self-interference cancellation; and transmitting information about the changed second RS allocation mode to a counterpart node, wherein the first RS allocation mode and second RS allocation mode are distinguished from each other on the basis of whether or not RSs, used for nonlinear component estimation of the residual self-interference signal, are additionally transmitted.

15 Claims, 10 Drawing Sheets

(51) Int. Cl.
| | |
|---|---|
| *H04L 25/02* | (2006.01) |
| *H04L 25/03* | (2006.01) |
| *H04L 5/00* | (2006.01) |
| *H04L 5/14* | (2006.01) |
| *H04W 72/04* | (2009.01) |
| *H04B 1/525* | (2015.01) |

(52) U.S. Cl.
CPC ............ *H04L 5/14* (2013.01); *H04L 25/02* (2013.01); *H04L 25/03* (2013.01); *H04W 72/044* (2013.01)

(58) Field of Classification Search
USPC ................................ 370/277–295
See application file for complete search history.

(56) References Cited

U.S. PATENT DOCUMENTS

| | | | |
|---|---|---|---|
| 2015/0103802 A1 | 4/2015 | Cheng et al. | |
| 2017/0063428 A1* | 3/2017 | Lee | H04B 1/525 |
| 2018/0048347 A1* | 2/2018 | Kim | H04B 1/525 |

FOREIGN PATENT DOCUMENTS

| | | |
|---|---|---|
| WO | WO 2014/200212 A1 | 12/2014 |
| WO | WO 2014/200262 A1 | 12/2014 |

\* cited by examiner

FIG. 8
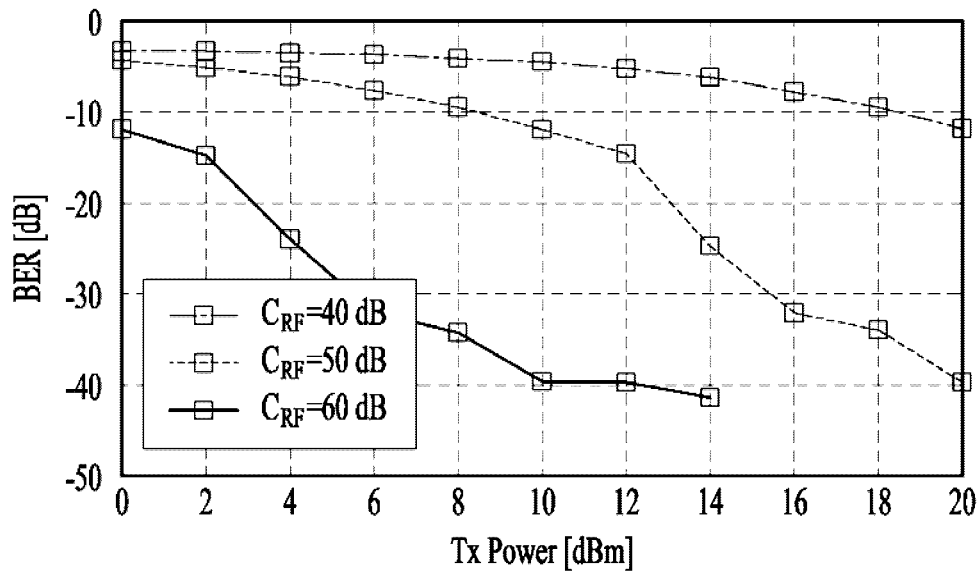
(a) 5dB isolation degradation
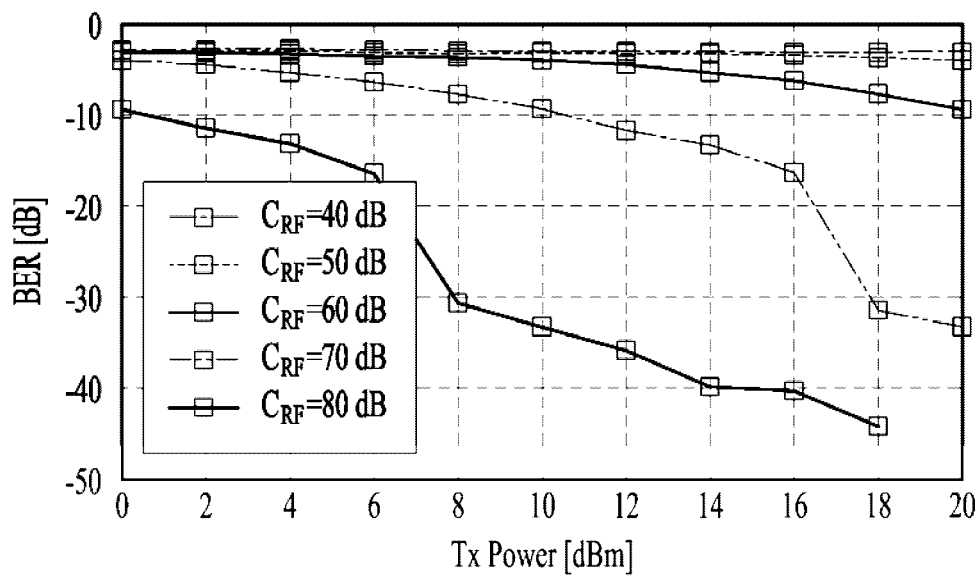
(b) 15dB isolation degradation

METHOD FOR TRANSMITTING REFERENCE SIGNAL ALLOCATION MODE INFORMATION BY DEVICE OPERATING IN FDR MODE

CROSS REFERENCE TO RELATED APPLICATIONS

This application is the National Phase of PCT International Application No. PCT/KR2016/000822, filed on Jan. 26, 2016, which claims priority under 35 U.S.C. 119(e) to U.S. Provisional Application No. 62/168,915, filed on Jun. 1, 2015, all of which are hereby expressly incorporated by reference into the present application.

TECHNICAL FIELD

The present disclosure relates to wireless communication, and more particularly, to a method for transmitting Reference Signal (RS) allocation mode information by a apparatus operating in Full Duplex Radio (FDR).

BACKGROUND ART

Full-duplex communication refers to technology for theoretically doubling system capacity as compared to a half-duplex communication for simultaneously performing transmission and reception in one node to orthogonally divide and use time resources or frequency resources.

FIG. 1 is a conceptual view of a User Equipment (UE) and a Base Station (BS) which support Full Duplex Radio (FDR).

In the FDR situation illustrated in FIG. 1, the following three types of interference are produced.

Intra-apparatus self-interference: Because transmission and reception take place in the same time and frequency resources, a desired signal and a signal transmitted from a BS or UE are received at the same time at the BS or UE. The transmitted signal is received with almost no attenuation at a Reception (Rx) antenna of the BS or UE, and thus with much larger power than the desired signal. As a result, the transmitted signal serves as interference.

UE to UE inter-link interference: An Uplink (UL) signal transmitted by a UE is received at an adjacent UE and thus serves as interference.

BS to BS inter-link interference: The BS to BS inter-link interference refers to interference caused by signals that are transmitted between BSs or heterogeneous BSs (pico, femto, and relay) in a HetNet state and received by an Rx antenna of another BS.

Among such three types of interference, intra-apparatus self-interference (hereinafter, Self-Interference (SI)) is generated only in an FDR system to significantly deteriorate performance of the FDR system. Therefore, first of all, intra-apparatus SI needs to be cancelled in order to operate the FDR system.

DISCLOSURE

Technical Problem

An aspect of the present disclosure devised to solve the conventional problem is to provide a method for transmitting Reference Signal (RS) allocation mode information by an apparatus operating in Full Duplex Radio (FDR).

Another aspect of the present disclosure is to provide an apparatus operating in FDR, for transmitting RS allocation mode information.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method for transmitting Reference Signal (RS) allocation mode information by an apparatus operating in Full Duplex Radio (FDR) includes determining to change an RS allocation mode from a first RS allocation mode to a second RS allocation mode to estimate a non-linear component of a residual self-interference signal after antenna self-interference cancellation and analog self-interference cancellation, and transmitting information about the switched second RS allocation mode to a correspondent node. The first RS allocation mode and the second RS allocation mode may be distinguished from each other depending on whether RSs used for estimation of the non-linear component of the residual self-interference signal are additionally transmitted. The change of the RS allocation mode may be determined on a subband basis. The second RS allocation mode may be a mode in which the RSs for estimation of the non-linear component of the residual self-interference signal are additionally allocated. The first RS allocation mode may be a mode in which the RSs for estimation of the non-linear component of the residual self-interference signal are not additionally allocated. The additional RSs may be mapped to a fourth symbol of a first slot or a second slot of a subframe. The information about the second RS allocation mode may include information about positions of resources to which the additional RSs are mapped.

The method may further include transmitting RSs allocated according to the second RS allocation mode.

The method may further include switching the RS allocation mode from the second RS allocation mode to the first RS allocation mode, and transmitting information about the first RS allocation mode to the correspondent node.

In another aspect of the present disclosure, an apparatus operating in FDR, for transmitting RS allocation mode information includes a processor configured to determine to change an RS allocation mode from a first RS allocation mode to a second RS allocation mode to estimate a non-linear component of a residual self-interference signal after antenna self-interference cancellation and analog self-interference cancellation, and a transmitter configured to transmit information about the switched second RS allocation mode to a correspondent node. The first RS allocation mode and the second RS allocation mode may be distinguished from each other depending on whether RSs used for estimation of the non-linear component of the residual self-interference signal are additionally transmitted. The processor may be configured to determine to change the RS allocation mode on a subband basis. The second RS allocation mode may be a mode in which the RSs for estimation of the non-linear component of the residual self-interference signal are additionally allocated. The first RS allocation mode may be a mode in which the RSs for estimation of the non-linear component of the residual self-interference signal are not additionally allocated. The information about the second RS allocation mode may include position information of resources to which the additional RSs are mapped. The transmitter may be configured to transmit RSs allocated according to the second RS allocation mode. The processor may be configured to switch the RS allocation mode from the second RS allocation mode to the first RS allocation mode, and the transmitter may be configured to transmit information about the first RS allocation mode to the correspondent node.

Advantageous Effects

The present disclosure proposes a signaling technique for performing non-linear digital Self Interference Cancellation (Self-IC) of a different order on a subband basis in order to enable stable digital Self-IC in consideration of the frequency selectivity of a residual Self Interference (SI) signal caused by antenna/analog Self-IC performance characteristics in an FDR transmission/reception system. Thus, the communication performance of an FDR environment may be increased.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 8 is a view illustrating BER performance, when digital Self-IC is performed after analog Self-IC using Baluns having isolation degradation of 5 dB and 15 dB.

BEST MODE FOR CARRYING OUT THE INVENTION

Figure 1:
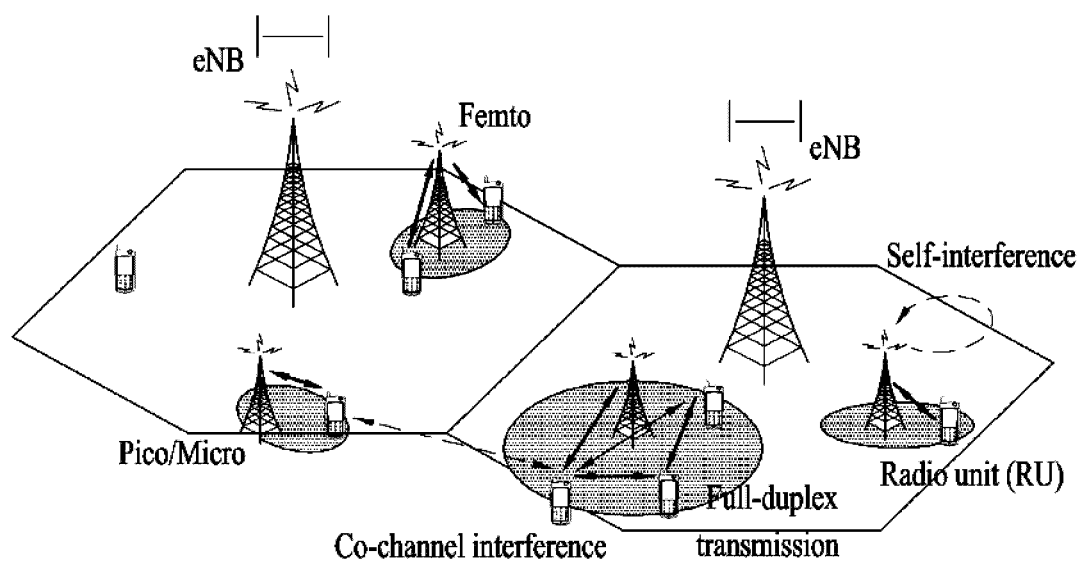
FIG. 1 is an exemplary view illustrating a network supporting a full-duplex/half-duplex communication operation scheme of a User Equipment (UE) proposed by the present disclosure.

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following description is given in the context of a mobile communication system being a $3^{rd}$ Generation Partnership Project Long Term Evolution (3GPP LTE) or 3GPP LTE-Advanced (3GPP LTE-A) system, the following description is applicable to other mobile communication systems except for features inherent to 3GPP LTE and 3GPP LTE-A.

Occasionally, to prevent the present invention from getting vaguer, structures and/or apparatuses known to the public are skipped or can be represented as block diagrams centering on the core functions of the structures and/or apparatuses. Wherever possible, the same reference numbers will be used throughout the drawings to refer to the same or like parts.

Besides, in the following description, assume that a terminal is a common name of such a mobile or fixed user stage apparatus as a User Equipment (UE), a Mobile Station (MS), an Advanced Mobile Station (AMS) and the like. And, assume that a Base Station (BS) is a common name of such a random node of a network stage communicating with a terminal as a Node B (NB), an eNode B (eNB), an Access Point (AP) and the like. Although the present specification is described based on IEEE 802.16m system, contents of the present invention may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The following descriptions are usable for various wireless access systems including Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like. CDMA can be implemented by such a radio technology as Universal Terrestrial Radio Access (UTRA), CDMA 2000 and the like. TDMA can be implemented with such a radio technology as Global System for Mobile communications)/General Packet Radio Service/Enhanced Data Rates for GSM Evolution (GSM/GPRS/EDGE). OFDMA can be implemented with such a radio technology as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3rd Generation Partnership Project (3GPP) Long Term Evolution (LTE) is a part of Evolved UMTS (E-UMTS) that uses E-UTRA. The 3GPP LTE employs OFDMA in DL and SC-FDMA in UL. And, LTE-Advanced (LTE-A) is an evolved version of 3GPP LTE.

Moreover, in the following description, specific terminologies are provided to help the understanding of the present invention. And, the use of the specific terminology can be modified into another form within the scope of the technical idea of the present invention.

Figure 2:
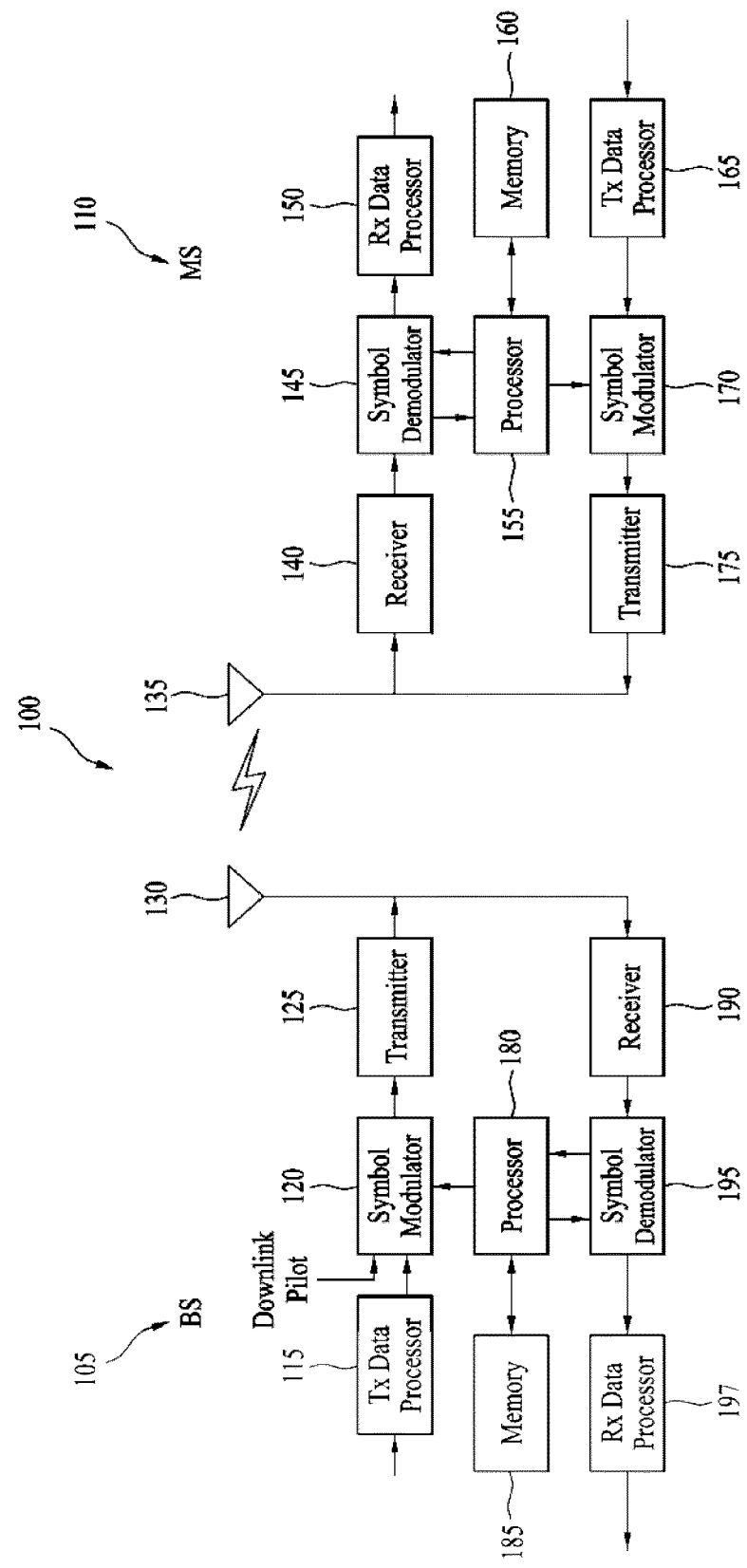
FIG. 2 is a block diagram of an evolved Node B (eNB) 105 and a UE 110 in a wireless communication system.

FIG. 2 is a block diagram for configurations of an eNB 105 and a UE 110 in a wireless communication system 100.

Although one eNB 105 and one UE 110 (D2D UE included) are shown in the drawing to schematically represent a wireless communication system 100, the wireless communication system 100 may include at least one base station and/or at least one user equipment.

Referring to FIG. 2, an eNB 105 may include a Transmitted (Tx) data processor 115, a symbol modulator 120, a transmitter 125, a transceiving antenna 130, a processor 180, a memory 185, a receiver 190, a symbol demodulator 195 and a received data processor 197. And, a UE 110 may include a Tx data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the eNB 105 and the UE 110 includes a plurality of antennas. Therefore, each of the eNB 105 and the UE 110 of the present invention supports a Multiple Input Multiple Output (MIMO) system. And, the eNB 105 according to the present invention may support both Single User-MIMO (SU-MIMO) and Multi User-MIMO (MU-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of Frequency Division Multiplexing (FDM), Orthogonal Frequency Division Multiplexing (OFDM), or Code Division Multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the UE 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the eNB 105, respectively.

In the UE 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the eNB 105 via the antenna 135.

In the eNB 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present invention as Application Specific Integrated Circuits (ASICs), Digital Signal Processors (DSPs), Digital Signal Processing Devices (DSPDs), Programmable Logic Devices (PLDs), Field Programmable Gate Arrays (FPGAs), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of Open System Interconnection (OSI) model well known to communication systems. A physical layer belongs to the 1st layer and provides an information transfer service via a physical channel. Radio Resource Control (RRC) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Figure 3:
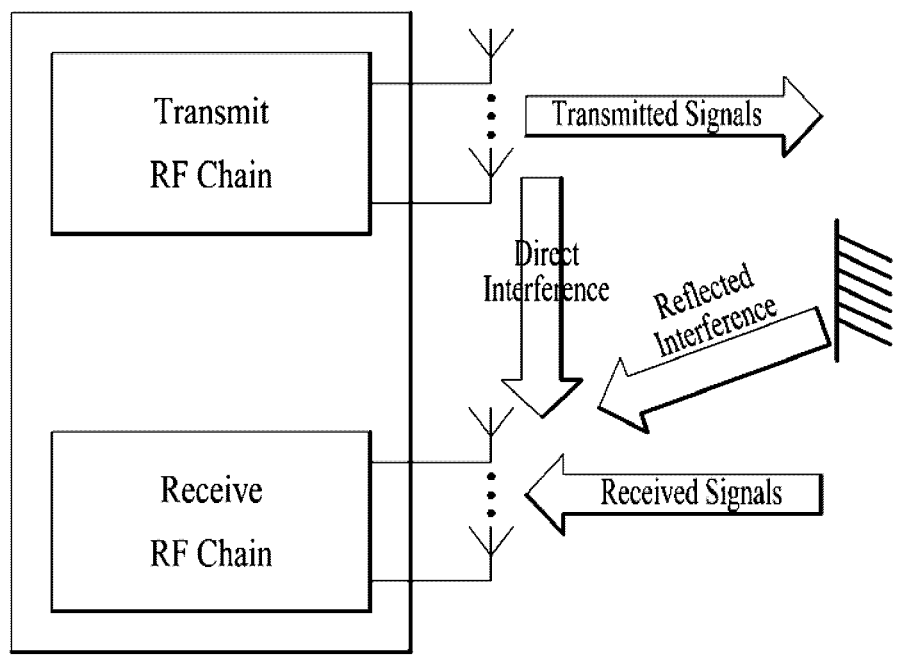
FIG. 3 is an exemplary conceptual view of a transmission/reception link and Self-Interference (SI) in a Full Duplex Radio (FDR) communication situation.

FIG. 3 is a conceptual diagram of Self-Interference (SI) and Tx/Rx links in an FDR communication environment.

Referring to FIG. 3, the SI can be divided into direct interference, which is caused when a signal transmitted from a Transmit (Tx) antenna is received at an Rx antenna of the same apparatus without path attenuation, and reflected interference, which is caused when a signal transmitted from a Tx antenna is reflected on a surrounding object and then received at an Rx antenna of the same apparatus. In addition, the strength of the SI is extremely higher than that of a desired signal due to a physical distance difference. Thus, the SI should be cancelled efficiently.

In order to efficiently implement an FDR system, self-IC requirements with respect to maximum transmit power of apparatuses may be determined as illustrated in Table 1 below (Self-IC requirements (BW=20 MHz) when the FDR is applied to a mobile communication system).

TABLE 1

| Node Type | Max. Tx Power ($P_A$) | Thermal Noise. (BW = 20 MHz) | Receiver NF | Receiver Thermal Noise Level | Self-IC Target ($P_A$ − TN − NF) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB(for UE) | −92 dBm | 115 dB |

Referring to [Table 1], it may be noted that to effectively operate the FDR system in a 20-MHz BW, a UE needs 119-dBm Self-IC performance. A thermal noise value may be changed to $N_{0,BW} = -174$ dBm+$10 \times \log_{10}$(BW) according to the BW of a mobile communication system. In Table 3, the thermal noise value is calculated on the assumption of a 20-MHz BW. In relation to Table 3, for Receiver Noise Figure (NF), a worst case is considered referring to the 3GPP specification requirements. Receiver Thermal Noise Level is determined to be the sum of a thermal noise value and a receiver NF in a specific BW.

Types of Self-IC Schemes and Methods for Applying the Self-IC Schemes

Figure 4:
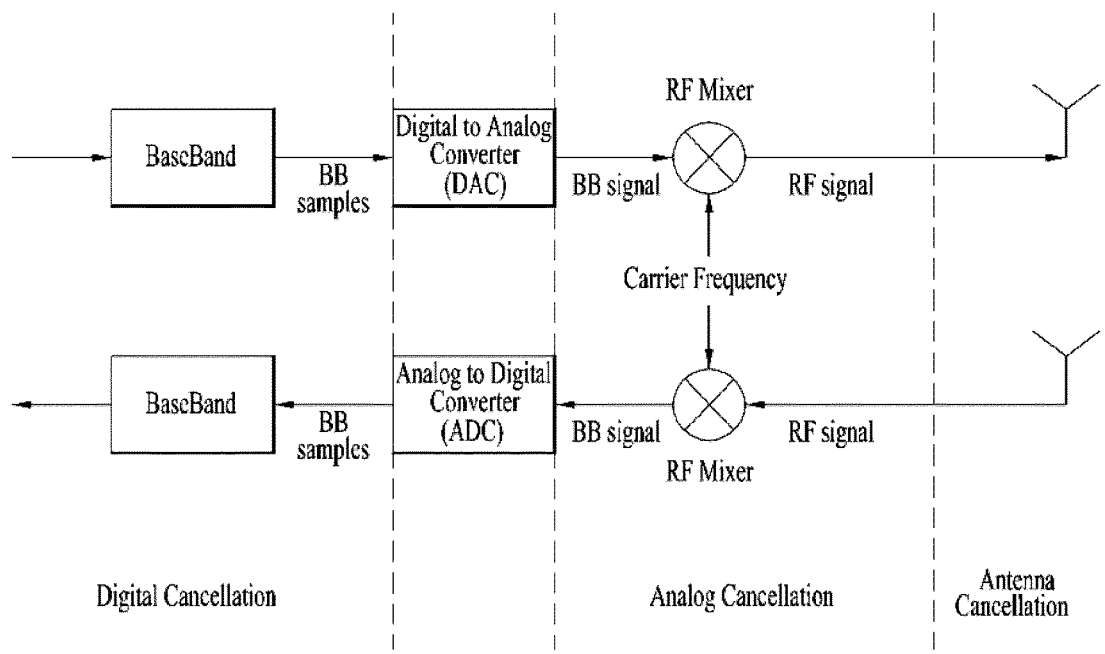
FIG. 4 is a view illustrating positions to which three cancellation schemes are applied at a Radio Frequency (RF) transmission and reception end (or RF front end) of an apparatus.

FIG. 4 is a view illustrating positions at which three Self-IC schemes are applied, in a Radio Frequency (RF) Tx and Rx end (or an RF front end) of a apparatus. Now, a brief description will be given of the three Self-IC schemes.

Antenna Self-IC: Antenna Self-IC is a Self-IC scheme that should be performed first of all Self-IC schemes. SI is cancelled at an antenna end. Most simply, transfer of an SI signal may be blocked physically by placing a signal-blocking object between a Tx antenna and an Rx antenna, the distance between antennas may be controlled artificially, using multiple antennas, or a part of an SI signal may be canceled through phase inversion of a specific Tx signal. Further, a part of an SI signal may be cancelled by means of multiple polarized antennas or directional antennas.

Analog Self-IC: Interference is canceled at an analog end before an Rx signal passes through an Analog-to-Digital Convertor (ADC). An SI signal is canceled using a duplicated analog signal. This operation may be performed in an RF region or an Intermediate Frequency (IF) region. SI signal cancellation may be performed in the following specific method. A duplicate of an actually received SI signal is generated by delaying an analog Tx signal and controlling the amplitude and phase of the delayed Tx signal, and subtracted from a signal received at an Rx antenna. However, due to the analog signal-based processing, the resulting implementation complexity and circuit characteristics may cause additional distortion, thereby changing interference cancellation performance significantly.

Digital Self-IC: Interference is canceled after an Rx signal passes through an ADC. Digital Self-IC covers all IC techniques performed in a baseband region. Most simply, a duplicate of an SI signal is generated using a digital Tx signal and subtracted from an Rx digital signal. Or techniques of performing precoding/postcoding in a baseband using multiple antennas so that a Tx signal of a UE or an eNB may not be received at an Rx antenna may be classified into digital Self-IC. However, since digital Self-IC is viable only when a digital modulated signal is quantized to a level enough to recover information of a desired signal, there is a need for the prerequisite that the difference between the signal powers of a designed signal and an interference signal remaining after interference cancellation in one of the above-described techniques should fall into an ADC range, to perform digital Self-IC.

Figure 5:
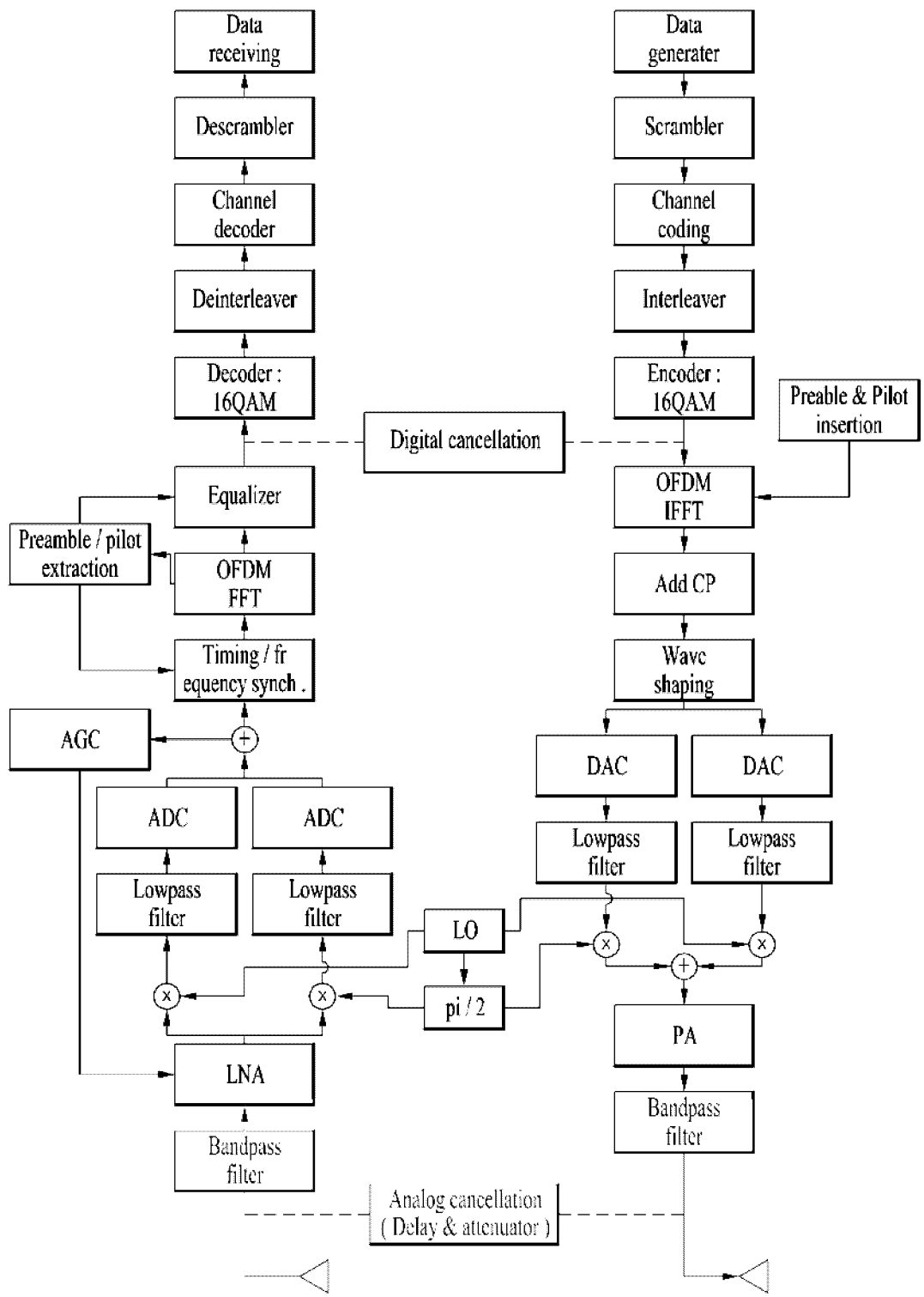
FIG. 5 is a block diagram of an apparatus for performing Self Interference Cancellation (Self-IC) in a communication apparatus proposed based on FIG. 4 in a communication system environment using Orthogonal Frequency Division Multiplexing (OFDM).

FIG. 5 is a block diagram of a Self-IC apparatus in a proposed communication apparatus in an OFDM communication environment based on FIG. 4.

While FIG. 5 shows that digital Self-IC is performed using digital SI information before Digital to Analog Conversion (DAC) and after ADC, it may be performed using a digital SI signal after Inverse Fast Fourier Transform (IFFT) and before Fast Fourier Transform (FFT). Further, although FIG. 5 is a conceptual view of Self-IC though separation of a Tx antenna from an Rx antenna, if antenna Self-IC is performed using a single antenna, the antenna may be configured in a different manner from in FIG. 5. A functional block may be added to or removed from an RF Tx end and an RF Rx end shown in FIG. 5 according to a purpose.

The present disclosure proposes a signaling technique for performing non-linear digital SI cancellation in a different order on a subband basis in order to enable stable digital Self-IC in consideration of the frequency selectivity of a residual SI signal caused by antenna/analog Self-IC performance characteristics in an FDR Tx/Rx system.

Signal Modeling in the FDR System

Since an FDR system uses the same frequency between a transmitted signal and a received signal, non-linear components in an RF signal have significant influence. In particular, a transmitted signal is distorted by non-linear properties of active elements such as a Power Amplifier (PA) and a Low Noise Amplifier (LNA), and, due to such distortion, the transmitted signal may be modeled as generation of a component corresponding to a high order. A component corresponding to an even order has influence on the vicinity of DC and thus may be efficiently cancelled using an existing AC coupling or filtering scheme. However, a component corresponding to an odd order is generated in the vicinity of a center frequency and thus cannot be easily cancelled unlike the even order, thereby having significant influence on reception. In consideration of the non-linear properties of the odd order, a received signal subjected to ADC in an FDR system may be expressed using the Parallel Hammerstein (PH) model as shown in [Equation 1] below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n) \quad \text{[Equation 1]}$$

Herein, $x_D(n)$ denotes data to be received by an RF end of an apparatus, $h_D(n)$ denotes a desired channel experienced by data to be received, $x_{SI}(n)$ denotes data transmitted by the RF end of the apparatus, $h_{SI,k}(n)$ denotes a self-interference channel experienced by data transmitted by the RF end of the apparatus, which is a linear component if k is 1 and is a nonlinear component if k is an odd number of 3 or more and $z(n)$ denotes Additive White Gaussian Noise (AWGN).

Various combinations of antenna/analog/digital Self-IC are essential to achieve Self-IC performance required for operation of a feasible FDR system. In general, each Self-IC scheme needs to be matched in order to achieve Self-IC performance based on schemes in various domains. Analog Self-IC needs to be designed in the analog domain according to the performance of antenna Self-IC in the antenna domain. Then, digital Self-IC needs to be designed in the digital domain according to the performance of antenna/analog Self-IC in the antenna/analog domain.

Figure 6:
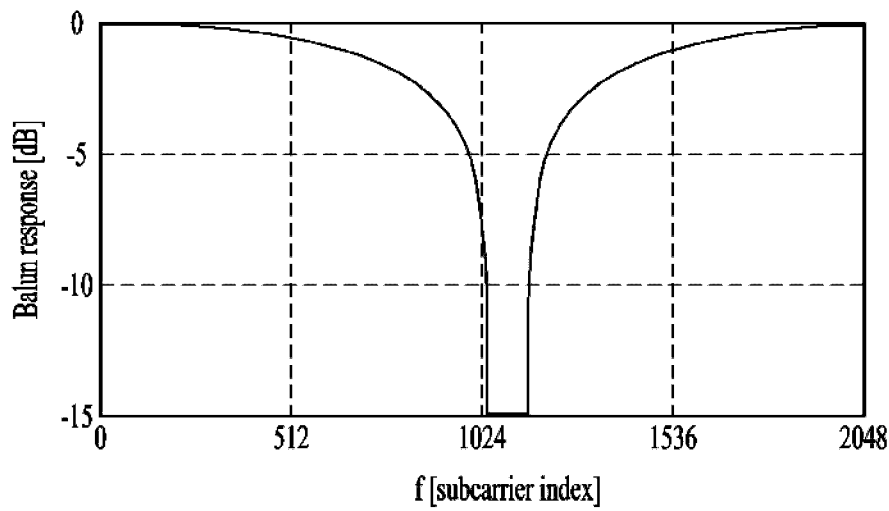
FIG. 6 is a view illustrating Balun frequency responses.

For example, if a Balun is used for analog Self-IC in an FDR system, Balun frequency responses are frequency selective as illustrated in FIG. 6.

FIG. 6 is a view illustrating Balun frequency responses.

Referring to FIG. 6, Balun frequency responses have a difference of 15 dB at maximum according to subcarrier indexes. Herein, a frequency-selective residual SI signal after analog Self-IC using a Balun degrades the performance of digital Self-IC, and the performance is illustrated in FIGS. 7 and 8.

Figure 7:
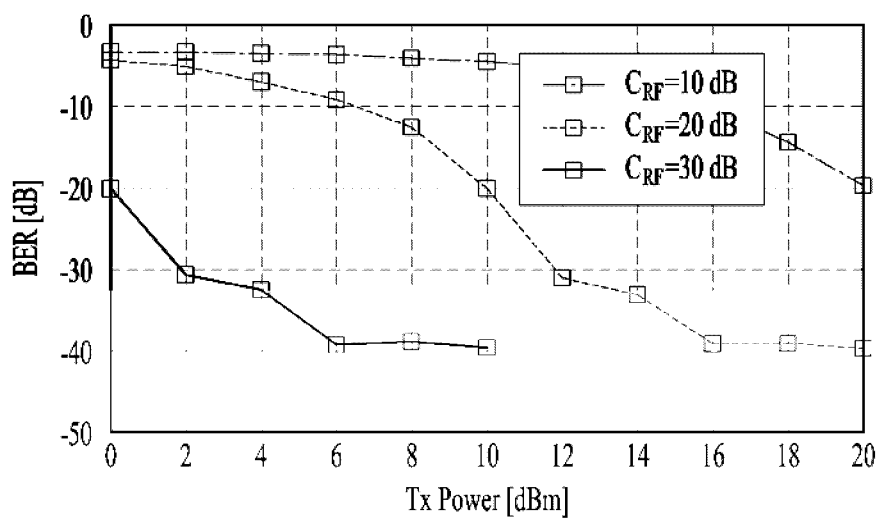
FIG. 7 is a view illustrating Bit Error rate (BER) performance, when digital Self-IC is performed after analog Self-IC using a Balun having ideal performance.

FIG. 7 is a view illustrating BER performance, when digital Self-IC is performance after analog Self-IC using a Balun having ideal performance, and FIG. 8 is a view illustrating BER performance, when digital Self-IC is performed after analog Self-IC using Baluns having isolation degradation of 5 dB and 15 dB.

The three graphs illustrated in FIGS. 7 and 8 are compared as follows. First, the graph related to analog Self-IC using a Balun having ideal (frequency-flat) frequency response characteristics reveals that if analog Self-IC is 30 dB (CRF=30 dB) and Tx power is 10 dBm, the BER performance is −40 dB. On the other hand, referring to FIG. 8, the two graphs related to analog Self-IC using Baluns having isolation degradation of 5 dB and 15 dB reveal that frequency selectivity of a residual SI signal caused by the analog Self-IC degrades Self-IC performance significantly.

It is noted from (a) of FIG. 8 that if Tx power is 10 dBm in spite of analog Self-IC of 60 dB (CRF=60B), the BER performance is lower than in the case of using the ideal Balun. It is noted from (b) of FIG. 8 that if Tx power is 10 dBm in spite of analog Self-IC of 80 dB (CRF=80B), the BER performance is lower than in the case of using the ideal Balun.

Further, even though antenna/analog Self-IC is performed using an analog Self-IC scheme that generates a Reference Signal (RS) using various combinations between a rat-race coupler and a phase shifter, an attenuator, and a true time delay apparatus, a residual SI signal is also frequency-selective due to the frequency selectivity of the phase shifter, attenuator, and true time delay apparatus.

Figure 9:
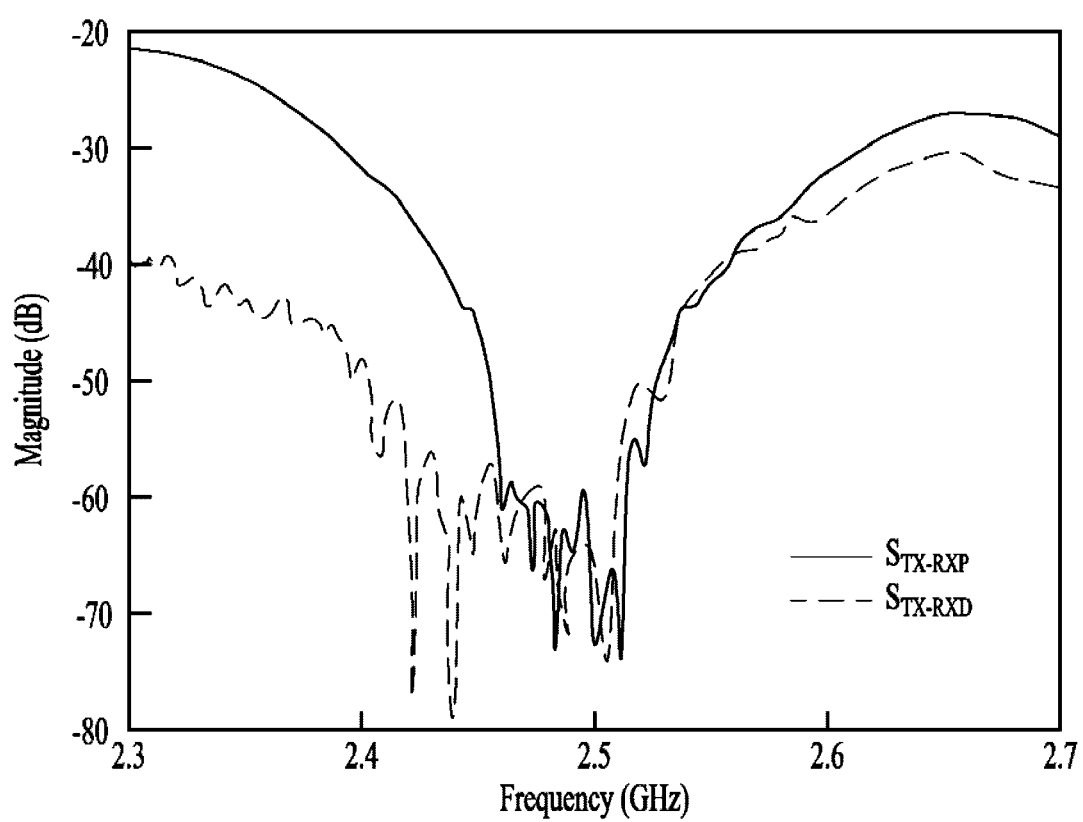
FIG. 9 is a view illustrating Self-IC levels after 1-Transmission (1-Tx) and 2-Reception (2-Rx) antenna Self-IC and analog Self-IC are performed using a rat-race coupler.

FIG. 9 is a view illustrating Self-IC levels after 1-Tx and 2-Rx antenna Self-IC and analog Self-IC are performed using a rat-race coupler.

Referring to FIG. 9, since the performance of analog Self-IC corresponding to a bandwidth of 80 MHz is not frequency-flat, residual SI produced after antenna/analog Self-IC is also frequency-selective and a maximum difference of 15 dB occurs according to frequency bands. This causes the degradation of digital Self-IC as observed from the above Balun cases.

It may be concluded based on the above various examples that the performance of digital Self-IC is affected by the characteristics of residual SI produced after antenna/analog Self-IC, and to relieve the performance degradation, digital Self-IC needs to be designed according to the characteristics of antenna/analog Self-IC. More specifically, it is necessary to design digital Self-IC according to the characteristics of antenna/analog Self-IC in an FDR environment.

Figure 10:
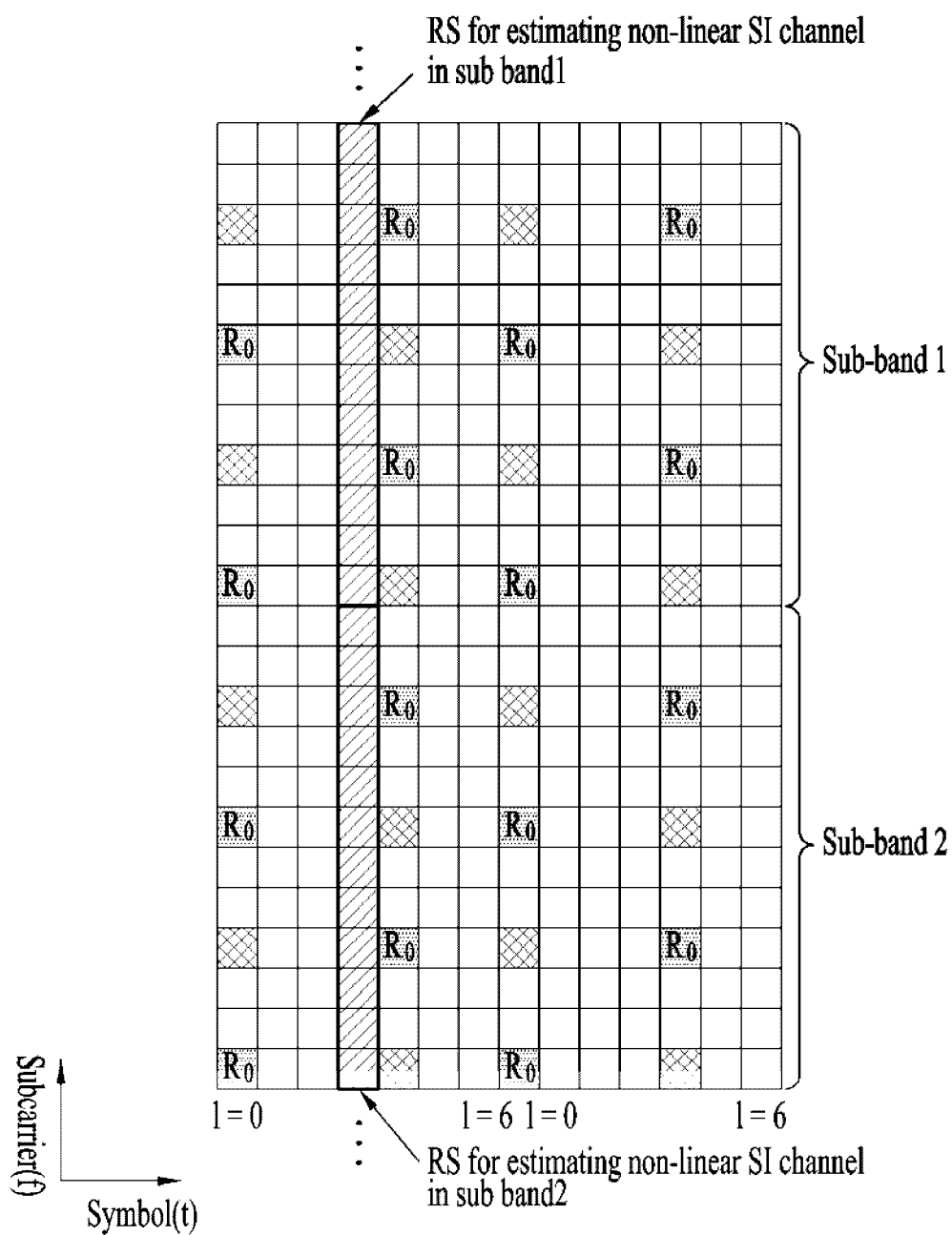
FIG. 10 is a view illustrating an exemplary Reference Signal (RS) allocation for subbandwise non-linear Self Interference (SI) channel estimation.

FIG. 10 is a view illustrating an exemplary RS allocation for subbandwise non-linear SI channel estimation.

For example, as illustrated in FIG. 10, RSs for estimating non-linear SI channel estimation may be arranged on a subband basis, while the basic structure of a 3GPP LTE/LTE-A downlink frame is maintained. For example, in FIG. 10, RSs for estimating a non-linear SI channel may be allocated and mapped to a symbol corresponding to symbol index 1=4 (i.e., a fourth symbol) in a first slot on a subband basis (e.g., in each of subband 1 and subband 2). An FDR apparatus may estimate a non-linear SI channel on a subband basis by transmitting RSs for estimating a non-linear SI channel on a subband basis as illustrated in FIG. 10. Further, RSs may be mapped in a different manner from that of FIG. 10 according to a non-linear estimation order.

Figure 11:
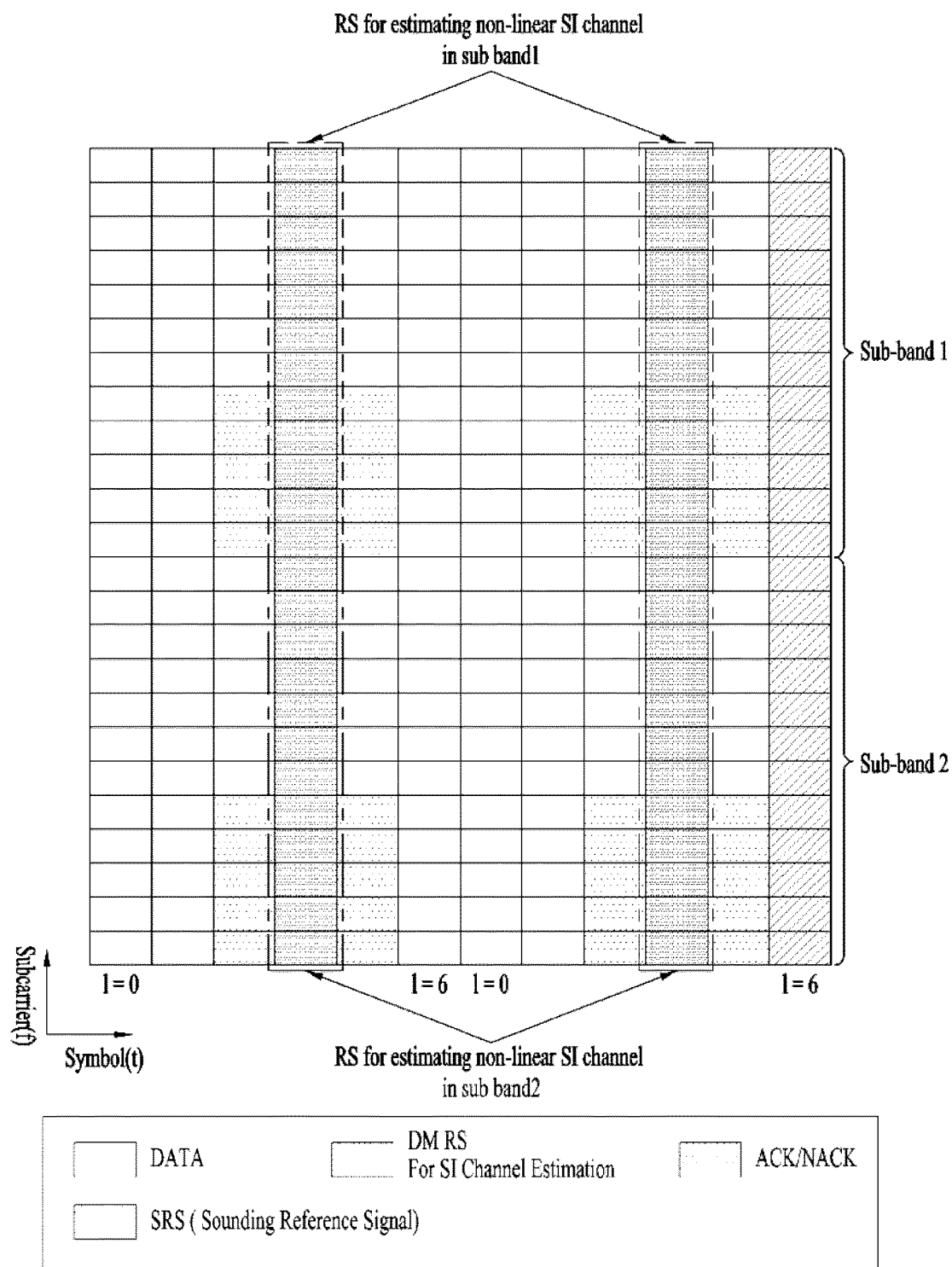
FIG. 11 is a view illustrating another exemplary RS allocation for subbandwise non-linear SI channel estimation.

FIG. 11 is a view illustrating another exemplary RS allocation for subbandwise non-linear SI channel estimation.

As illustrated in FIG. 11, RSs for estimating non-linear SI channel estimation (e.g., herein, RSs for non-linear SI channel estimation, designed in a DM RS symbol) may be arranged on a subband basis, while the basic structure of a 3GPP LTE/LTE-A uplink frame is maintained. For example, in FIG. 11, RSs for estimating a non-linear SI channel may be allocated and mapped to a symbol corresponding to symbol index 1=4 in first and second slots on a subband basis (e.g., in each of subband 1 and subband 2).

Further, RSs may be mapped in a different manner from that of FIG. 11 according to a non-linear estimation order.

Accordingly, in the present disclosure, a variation in the power level of a residual SI signal according to the performance of analog Self-IC is measured or estimated, and thus the order of a non-linear SI component to be considered for digital Self-IC should be determined. As described before, after antenna/analog Self-IC, the power level of the residual SI signal is changed according to a frequency, and there is a need for designing an RS for estimating a channel of the residual SI signal according to this frequency-selective frequency response, differently for each band.

Embodiment 1

Additional RS resources on a downlink may be allocated for estimating a non-linear component of a residual SI signal, which is different in each subband according to the frequency selectivity of the residual SI signal after antenna/analog Self-IC at the eNB, or data may be allocated to downlink resources which have been allocated to legacy RSs for estimating a non-linear component on a subband basis. An eNB may signal this changed downlink resource allocation information to a UE by a physical-layer signal (e.g., a Physical Downlink Control Channel (PDCCH) or an Enhanced PDCCH (EPDCCH)) or a higher-layer signal (e.g., an RRC signal).

If the eNB needs an additional RS allocation for subbandwise channel estimation of a non-linear component of a residual SI signal due to different antenna/analog Self-IC performance for different subbands, the eNB may signal additionally allocated downlink RS information (e.g., information about the positions of additionally allocated RS resources, and so on) to the UE. Therefore, interference with an RS (pilot contamination) caused by channel estimation at the eNB may be prevented, and the eNB may perform stable digital Self-IC based on high channel estimation performance.

For example, the UE may determine available resources based on the RS information received from the eNB by signaling. For example, REs to which additional RSs allocated for channel estimation of a non-linear SI component by the eNB have been mapped may be punctured for uplink transmission.

If the eNB does not need an additionally allocated RS for channel estimation of a non-linear component of a legacy residual SI signal which is different in each subband, due to the same antenna/analog Self-IC performance for each subband (if channel estimation is performed using RSs of the same density for channel estimation of a non-linear SI signal, with the same order in all or a part of total bands), the eNB may release the RS allocation, use these downlink resources for another usage (e.g., for an EPDCCH or a data channel (Physical Downlink Shared Channel (PDSCH)), and signal information about the released downlink resources to the UE. Then, the UE may use its uplink resources the usage of which has been restricted by existing pilot contamination caused by the RSs additionally allocated by the eNB, for another usage (e.g., a Physical Uplink Control Channel (PUCCH) or a Physical Uplink Shared Channel (PUSCH)), thereby increasing the efficiency of uplink resources.

For example, the UE may lift a constraint imposed on REs which have been punctured and thus unused in a legacy uplink transmission, based on RS information received from the eNB by signaling, and use the REs under the same condition as for other resources.

Embodiment 2

Additional RS resources on an uplink may be allocated for estimating a non-linear component of a residual SI signal, which is different in each subband according to the frequency selectivity of the residual SI signal after antenna/analog Self-IC at the UE, or data may be allocated to uplink resources which have been allocated to RSs for estimating a non-linear component on a subband basis. The UE may signal this changed uplink resource allocation information to an eNB by a physical-layer signal (e.g., a PUCCH or a PUSCH) or a higher-layer signal (e.g., an RRC signal).

If the UE needs an additional RS allocation for subbandwise channel estimation of a non-linear component of a residual SI signal due to different antenna/analog Self-IC performance for different subbands, the UE may signal additionally allocated uplink RS information (e.g., information about the positions of additionally allocated RS resources, and so on) to the eNB. Therefore, interference with an RS (pilot contamination) caused by channel estimation at the UE may be prevented, and the UE may perform stable digital Self-IC based on high channel estimation performance.

For example, the eNB may determine available resources based on the RS information received from the UE by signaling. For example, REs to which additional RSs allocated for channel estimation of a non-linear SI component by the UE have been mapped may be punctured for downlink transmission.

If the UE does not need an additionally allocated RS for channel estimation of a non-linear component of a legacy residual SI signal which is different in each subband, due to the same antenna/analog Self-IC performance for each subband (if channel estimation is performed using RSs of the same density for channel estimation of a non-linear SI signal, with the same order in all or a part of total bands), the UE may release the RS allocation, use these uplink resources for another usage (e.g., for a PUCCH or PUSCH). As the UE signals information about the released uplink resources to the eNB, the eNB may use its downlink resources the usage of which has been restricted by existing pilot contamination, for another usage (e.g., a PDCCH, EPCCH, or PDSCH), thereby increasing the efficiency of downlink resources.

For example, the eNB may lift a constraint imposed on REs which have been punctured and thus unused in a legacy downlink transmission, based on RS information received from the UE by signaling, and use the REs under the same condition as for other resources.

Embodiment 3

The above-defined subbandwise RS resource allocation information which is changed according to the performance of analog Self-IC of an eNB may be signaled to an adjacent eNB and a small-cell eNB through an X2 interface by a higher-layer signal (RRC signal).

Embodiment 4

Subbandwise RS resource allocation information which is changed according to the performance of analog Self-IC of a UE may be signaled to an adjacent UE by a Device-to-Device (D2D) signal and a higher-layer signal (RRC signal).

In the methods of Embodiment 1 to Embodiment 4, changed RS resource allocation information may be transmitted by transmitting an index or an index difference in a table listing RS resource allocation information used for each subband according to the characteristics of each subband based on the types and performances of used antenna/analog Self-IC schemes, to thereby reduce the overhead of a signaling signal. Or, changed RS allocation information may be applied by estimating the changed RS allocation information based on other information (e.g. an average performance of analog Self-IC) without signaling.

The methods of Embodiment 1 to Embodiment 4 may be selectively performed, only if the frequency selectivity of a residual SI signal after antenna/analog Self-IC is equal to or larger than a predetermined threshold (e.g., only if the difference between the best performance and the worst performance according to frequencies is equal to or larger than a threshold). For example, if the frequency selectivity of the residual SI signal after antenna/analog Self-IC is equal to or less than the predetermined threshold, Self-IC is relatively stable. Thus, resource allocation information about an additional RS allocation may be selectively transmitted to an eNB by a physical-layer or higher-layer signal.

Further, the methods of Embodiment 1 to Embodiment 4 may be selectively performed, only if an eNB or a UE operates in FDR. When a UE operating in FDR is connected to an eNB, or when a UE wanting downlink reception and a UE wanting uplink transmission simultaneously intend to conduct communication, the eNB may operate in FDR. Herein, the methods of Embodiment 1 to Embodiment 4 may be selectively performed. In general, downlink traffic is more than uplink traffic. Therefore, for a UE to operate in FDR, a part of UEs wanting uplink transmission may operate in FDR. Herein, the methods of Embodiment 1 to Embodiment 4 may be selectively performed. For example, the duration of an FDR operation of an eNB or a UE may be estimated based on a Buffer Status Report (BSR) of the UE. The eNB may signal information to the UE at a necessary time point by a physical-layer signal or a higher-layer signal. To receive necessary information at a desired time point by the signaling, the eNB may trigger control signal transmission of the UE.

Since the above-described various embodiments may also be included as implementation methods of the present disclosure, it is obvious that they may be regarded as a kind of exemplary proposed methods. Further, although the foregoing embodiments may be implemented independently, some of the embodiments may be combined (or integrated). An eNB may transmit information indicating whether the embodiments are to be applied (or information indicating rules of the embodiments) to a UE by a predefined signal (e.g., a physical-layer signal or a higher-layer signal).

The embodiments of the present disclosure described above are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present disclosure or included as a new claim by a subsequent amendment after the application is filed.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method for transmitting RS allocation mode information by a apparatus operating in FDR is applicable industrially in various wireless communication systems such as a 3GPP LTE/LTE-A system and a 5G communication system.

The invention claimed is:

1. A method for transmitting Reference Signal (RS) allocation mode information by an apparatus operating in Full Duplex Radio (FDR) scheme, the method comprising:
    determining to change an RS allocation mode from a first RS allocation mode to a second RS allocation mode to estimate a non-linear component of a residual self-interference signal after antenna self-interference cancellation and analog self-interference cancellation; and
    transmitting information about the changed second RS allocation mode to a correspondent node,
    wherein the first RS allocation mode and the second RS allocation mode are distinguished from each other depending on whether RSs used for estimation of the non-linear component of the residual self-interference signal are additionally transmitted.

2. The method according to claim 1, wherein the change of the RS allocation mode is determined on a subband basis.

3. The method according to claim 1, wherein the second RS allocation mode is a mode in which the RSs for estimation of the non-linear component of the residual self-interference signal are additionally allocated.

4. The method according to claim 1, wherein the first RS allocation mode is a mode in which the RSs for estimation of the non-linear component of the residual self-interference signal are not additionally allocated.

5. The method according to claim 3, wherein the additional RSs are mapped to a fourth symbol of a first slot or a second slot of a subframe.

6. The method according to claim 1, wherein the information about the second RS allocation mode include position information of resources to which the additional RSs are mapped.

7. The method according to claim 1, further comprising:
    transmitting RSs allocated according to the second RS allocation mode.

8. The method according to claim 1, further comprising:
    changing the RS allocation mode from the second RS allocation mode to the first RS allocation mode; and
    transmitting information about the first RS allocation mode to the correspondent node.

9. An apparatus operating in Full Duplex Radio (FDR) scheme, for transmitting Reference Signal (RS) allocation mode information, the apparatus comprising:
    a processor configured to determine to change an RS allocation mode from a first RS allocation mode to a second RS allocation mode to estimate a non-linear component of a residual self-interference signal after antenna self-interference cancellation and analog self-interference cancellation; and
    a transmitter configured to transmit information about the changed second RS allocation mode to a correspondent node,
    wherein the first RS allocation mode and the second RS allocation mode are distinguished from each other depending on whether RSs used for estimation of the non-linear component of the residual self-interference signal are additionally transmitted.

10. The apparatus according to claim 9, wherein the processor is configured to determine to change the RS allocation mode on a subband basis.

11. The apparatus according to claim 9, wherein the second RS allocation mode is a mode in which the RSs for estimation of the non-linear component of the residual self-interference signal are additionally allocated.

12. The apparatus according to claim 9, wherein the first RS allocation mode is a mode in which the RSs for estimation of the non-linear component of the residual self-interference signal are not additionally allocated.

13. The apparatus according to claim 9, wherein the information about the second RS allocation mode include position information of resources to which the additional RSs are mapped.

14. The apparatus according to claim 9, wherein the transmitter is configured to transmit RSs allocated according to the second RS allocation mode.

15. The apparatus according to claim 9, wherein the processor is configured to change the RS allocation mode from the second RS allocation mode to the first RS allocation mode, and the transmitter is configured to transmit information about the first RS allocation mode to the correspondent node.

* * * * *